United States Patent
Tsai et al.

(10) Patent No.: US 10,642,266 B2
(45) Date of Patent: May 5, 2020

(54) SAFE WARNING SYSTEM FOR AUTOMATIC DRIVING TAKEOVER AND SAFE WARNING METHOD THEREOF

(71) Applicant: Automotive Research & Testing Center, Changhua County (TW)

(72) Inventors: Hung-Yih Tsai, Changhua County (TW); Chih-Neng Liang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 327 days.

(21) Appl. No.: 15/857,581

(22) Filed: Dec. 28, 2017

(65) Prior Publication Data

US 2019/0204826 A1 Jul. 4, 2019

(51) Int. Cl.
*B60K 35/00* (2006.01)
*G05D 1/00* (2006.01)
(Continued)

(52) U.S. Cl.
CPC .......... *G05D 1/0061* (2013.01); *B60K 31/00* (2013.01); *B60W 50/082* (2013.01); *B60K 35/00* (2013.01);
(Continued)

(58) Field of Classification Search
CPC .............. B60K 31/00; B60K 2370/175; B60K 2370/178; B60K 2370/592; B60K 35/00;
(Continued)

(56) References Cited

U.S. PATENT DOCUMENTS 9,869,560 B2 * 1/2018 Gordon ............... G01C 21/3415
10,452,074 B2 * 10/2019 Luo ..................... B60W 30/143
(Continued)

FOREIGN PATENT DOCUMENTS

CN 103383265 B 12/2016

OTHER PUBLICATIONS

Olaverri-Monreal et al., Human Factors in the Design of Human—Machine Interaction: An Overview Emphasizing V2X Communication, 2017, IEEE, p. 302-313 (Year: 2017).*
(Continued)

*Primary Examiner* — McDieunel Marc
(74) *Attorney, Agent, or Firm* — CKC & Partners Co., LLC

(57) ABSTRACT

A safe warning system for automatic driving takeover includes a sensing unit, a wireless communicating unit, a driver detecting unit, a system self-testing unit, a human-machine interaction computing unit and an interface warning unit. The sensing unit senses an environmental condition to generate an environmental condition datum. The wireless communicating unit receives a cloud datum to generate a field status datum. The driver detecting unit detects the driver to generate a driver controlling datum. The system self-testing unit detects the sensing unit, the wireless communicating unit and the driver detecting unit to generate a system testing datum. The human-machine interaction computing unit receives and computes the environmental condition datum, the field status datum, the driver controlling datum and the system testing datum to generate an interface warning datum. The interface warning unit receives the interface warning datum and shows a warning signal to the driver.

14 Claims, 8 Drawing Sheets

(51) Int. Cl.
*B60W 50/08* (2020.01)
*B60K 31/00* (2006.01)

(52) U.S. Cl.
CPC .. *B60K 2370/175* (2019.05); *B60K 2370/178* (2019.05); *B60K 2370/592* (2019.05); *G05D 2201/0213* (2013.01)

(58) Field of Classification Search
CPC ......... G05D 1/0061; G05D 2201/0213; G05D 1/0088; B60W 30/182; B60W 30/095; B60W 40/09; B60W 50/0097; B60W 40/06; B60W 50/14; G08G 1/096725; G06F 9/4887; G01C 21/3415; B62D 5/0255
See application file for complete search history.

(56) References Cited

U.S. PATENT DOCUMENTS

| | | | | |
|---|---|---|---|---|
| 2017/0368936 | A1* | 12/2017 | Kojima | B60W 40/06 |
| 2018/0129206 | A1* | 5/2018 | Harada | B62D 15/0255 |
| 2018/0151066 | A1* | 5/2018 | Oba | G08G 1/096725 |
| 2018/0162396 | A1* | 6/2018 | Ibuka | B60W 30/095 |
| 2018/0173227 | A1* | 6/2018 | Mukai | B60W 50/0097 |
| 2018/0186376 | A1* | 7/2018 | Lee | B60W 30/182 |
| 2019/0047588 | A1* | 2/2019 | Yabuuchi | G05D 1/0088 |
| 2019/0082377 | A1* | 3/2019 | Silver | B60W 50/14 |
| 2019/0184997 | A1* | 6/2019 | Zheng | B60W 40/09 |
| 2019/0187700 | A1* | 6/2019 | Zheng | G06F 9/4887 |

OTHER PUBLICATIONS

Kharchenko et al., The cooperative human-machine interfaces for cloud-based advanced driver assistance systems: Dynamic analysis and assurance of vehicle safety, 2014, IEEE, p. 1-5 (Year: 2014).*
Ibarra-Orozco et al., Towards a Ready-to-Use Drivers' Vigilance Monitoring System, 2008, IEEE, p. 802-807 (Year: 2008).*
Zhou et al., Safety driving assistance system design in intelligent vehicles, 2014, IEEE, p. 2637-2642 (Year: 2014).*

* cited by examiner

SAFE WARNING SYSTEM FOR AUTOMATIC DRIVING TAKEOVER AND SAFE WARNING METHOD THEREOF

BACKGROUND

Technical Field

The present disclosure relates to a safe warning system and a safe warning method thereof. More particularly, the present disclosure relates to a safe warning system for automatic driving takeover and a safe warning method thereof.

Description of Related Art

In recent years, an automatic driving system (ADS) will be one of the intelligent vehicle technologies developed by the manufacturer for realizing a driverless automatic driving technology in the future. The automatic driving system is mainly used to control a vehicle by a controlling device and various sensors so as to enhance driving safety.

There are many automatic driving technologies in the market. One conventional automatic driving technology is to switch a driving mode between a manual driving mode and an automatic driving mode by a manual switching device. If the driver wants to drive the vehicle in the automatic driving mode, the driver can operate the manual switching device to change the driving mode to the automatic driving mode. If the driver wants to drive the vehicle in the manual driving mode, the driver can operate the manual switching device to change the driving mode to the manual driving mode. Although the driver can take over the vehicle by switching, the conventional automatic driving system does not notify the driver of the takeover time point and the corresponding emergency level. That is, the conventional automatic driving system does not provide a safety takeover strategy, hence the conventional automatic driving system has some problems such as easy to be touched by mistake, insufficient safety and wrong operation after the takeover. In addition, the driver used the conventional automatic driving system needs to touch the steering wheel with their hands at predefined intervals for ensuring an attention of the driver. But this action often results in an invisible burden and a distress to the driver.

Therefore, it is commercially desirable to develop a safe warning system for automatic driving takeover and a safe warning method thereof, which can reduce the distress, increase the safety and guide the drive in the takeover.

SUMMARY

According to one aspect of the present disclosure, a safe warning system for automatic driving takeover, which is disposed on a vehicle to warn a driver, is provided. The safe warning system for automatic driving takeover includes a sensing unit, a wireless communicating unit, a driver detecting unit, a system self-testing unit, a human-machine interaction computing unit and an interface warning unit. The sensing unit is disposed on the vehicle, wherein the sensing unit is configured for sensing an environmental condition of the vehicle to generate an environmental condition datum. The wireless communicating unit is disposed on the vehicle, wherein the wireless communicating unit is configured for receiving a cloud datum to generate a field status datum according to the cloud datum. The driver detecting unit is disposed on the vehicle and corresponding to the driver, wherein the driver detecting unit is configured for detecting the driver to generate a driver controlling datum. The system self-testing unit is disposed on the vehicle and signally connected to the sensing unit, the wireless communicating unit and the driver detecting unit, wherein the system self-testing unit is configured for detecting the sensing unit, the wireless communicating unit and the driver detecting unit to generate a system testing datum. The human-machine interaction computing unit is signally connected to the sensing unit, the wireless communicating unit, the driver detecting unit and the system self-testing unit, wherein the human-machine interaction computing unit receives and computes the environmental condition datum, the field status datum, the driver controlling datum and the system testing datum to generate a driving takeover time margin and a driving takeover time, and the human-machine interaction computing unit compares the driving takeover time margin and the driving takeover time to generate an interface warning datum. The interface warning unit is signally connected to the human-machine interaction computing unit, wherein the interface warning unit receives the interface warning datum and shows a warning signal to the driver according to the interface warning datum.

According to another aspect of the present disclosure, a safe warning method for automatic driving takeover, which is for warning a driver in a vehicle, includes steps as follows. An environmental sensing step is provided, wherein the environmental sensing step is for driving a sensing unit to sense an environmental condition of the vehicle so as to generate an environmental condition datum. A wireless communicating step is provided, wherein the wireless communicating step is for driving a wireless communicating unit to receive a cloud datum so as to generate a field status datum according to the cloud datum. A driver detecting step is provided, wherein the driver detecting step is for driving a driver detecting unit to detect the driver so as to generate a driver controlling datum. A system self-testing step is provided, wherein the system self-testing step is for driving a system self-testing unit to detect the sensing unit, the wireless communicating unit and the driver detecting unit so as to generate a system testing datum. A human-machine interaction computing step is provided, wherein the human-machine interaction computing step is for driving a human-machine interaction computing unit to receive and compute the environmental condition datum, the field status datum, the driver controlling datum and the system testing datum so as to generate a driving takeover time margin and a driving takeover time, and driving the human-machine interaction computing unit to compare the driving takeover time margin and the driving takeover time so as to generate an interface warning datum. A warning step is provided, wherein the warning step is for driving an interface warning unit to receive the interface warning datum so as to show a warning signal to the driver according to the interface warning datum.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
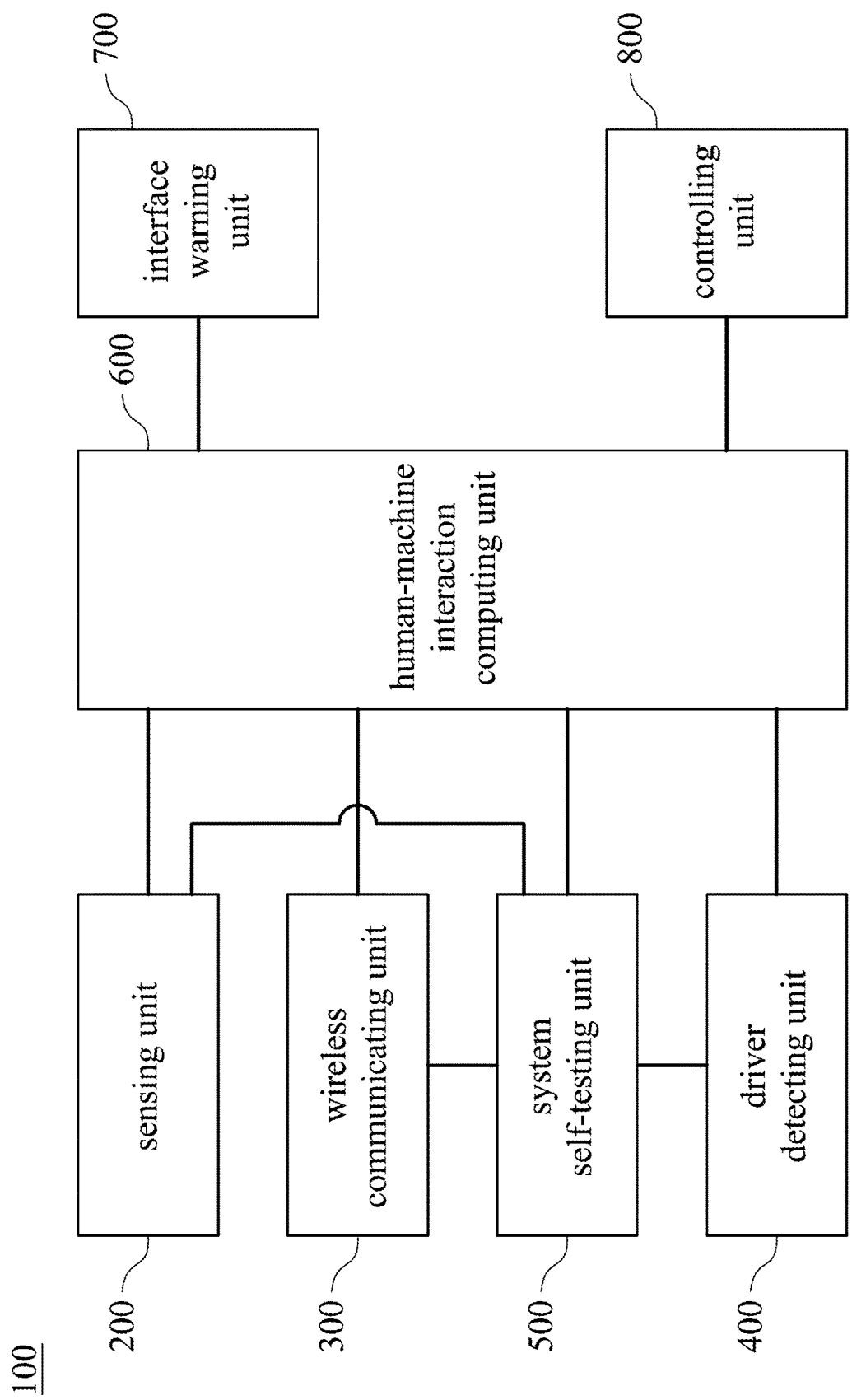
FIG. 1 is a block diagram showing a safe warning system for automatic driving takeover according to one embodiment of the present disclosure.
Figure 2:
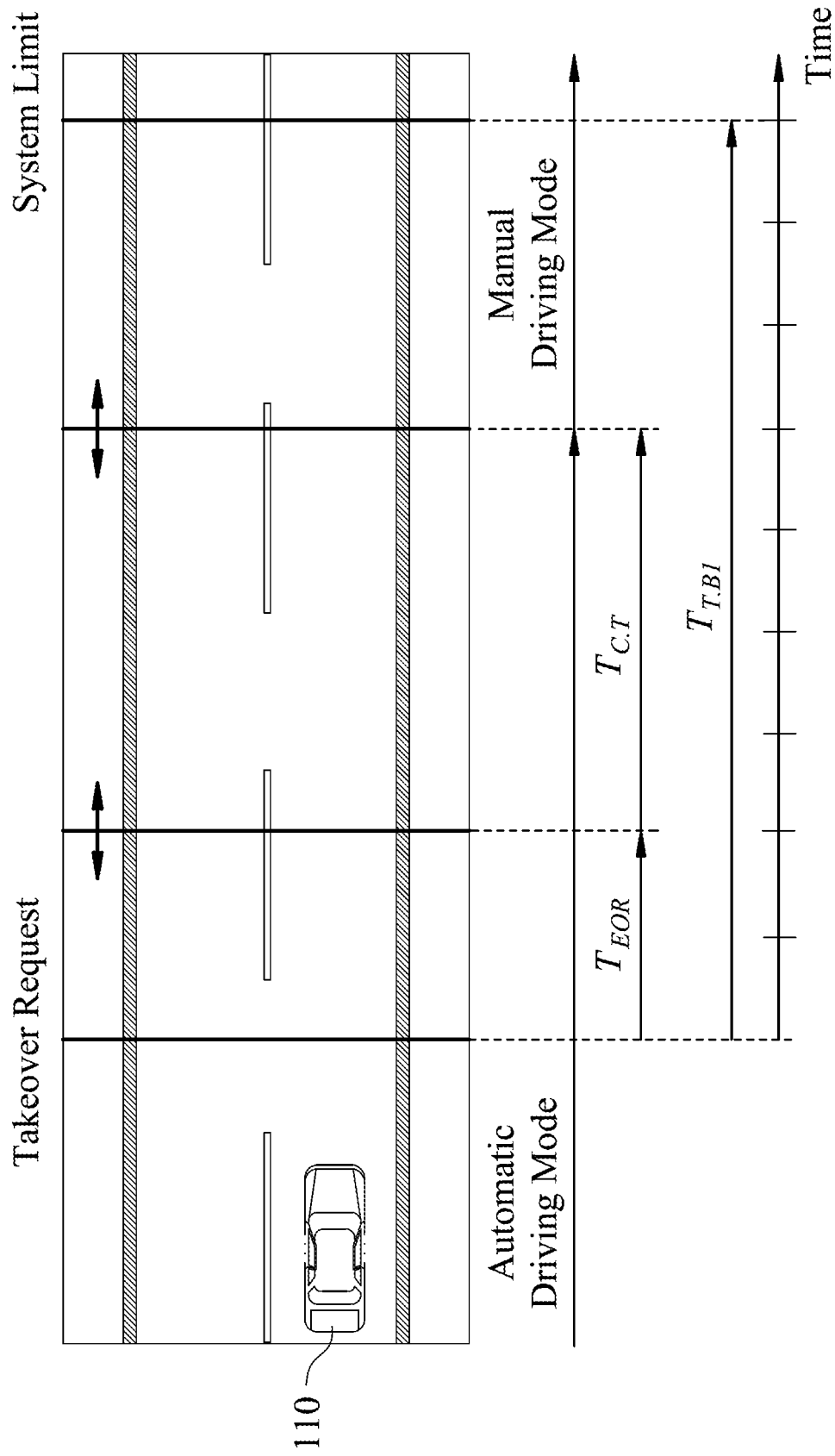
FIG. 2 is a timing diagram showing the safe warning system for automatic driving takeover of FIG. 1.

FIG. 1 is a block diagram showing a safe warning system for automatic driving takeover 100 according to one embodiment of the present disclosure. FIG. 2 is a timing diagram showing the safe warning system for automatic driving takeover 100 of FIG. 1. In FIG. 1 and FIG. 2, the safe warning system for automatic driving takeover 100 is disposed on a vehicle 110 to warn a driver. The safe warning system for automatic driving takeover 100 includes a sensing unit 200, a wireless communicating unit 300, a driver detecting unit 400, a system self-testing unit 500, a human-machine interaction computing unit 600, an interface warning unit 700 and a controlling unit 800.

The sensing unit 200 is disposed on the vehicle 110, and configured for sensing an environmental condition of the vehicle 110 to generate an environmental condition datum. There can be a plurality of sensing units 200, wherein the sensing unit 200 can be a two-dimensional camera, a three-dimensional camera, a Radio Detection and Ranging (RADAR), a Light Detection and Ranging (LiDAR), an Inertial Measurement Unit (IMU), a Global Positioning System (GPS), a Real Time Kinematic (RTK) or a combination of the above devices. In the present disclosure, various environmental condition data detected by the sensing unit 200 are transmitted to the human-machine interaction computing unit 600 as a determining basis for the driver taking over the vehicle 110.

The wireless communicating unit 300 is disposed on the vehicle 110 and configured for receiving a cloud datum. The wireless communicating unit 300 generates a field status datum according to the cloud datum. Moreover, the wireless communicating unit 300 can download and display data form a cloud or an internet of vehicles through a wireless transmission. The wireless transmission can be a third generation mobile communication (3G), a fourth generation of wireless/mobile communication (4G), a fifth generation mobile networks (5G) or other feasible mobile communication transmission mode.

The driver detecting unit 400 is disposed on the vehicle 110 and corresponding to the driver, wherein the driver detecting unit 400 is configured for detecting the driver to generate a driver controlling datum. The driver detecting unit 400 can be a camera and an image recognition module, wherein the camera signally connects to the image recognition module. The camera is configured for capturing the driver's facial expression, and the image recognition module receives and recognizes the facial expression to analyze the driver's mental state. In addition, the driver detecting unit 400 also can be a variety of physiological signal capturing devices to accurately detect the driver's mental state and physiological state, thereby determining whether the driver can control the vehicle 110.

The system self-testing unit 500 is disposed on the vehicle 110 and signally connected to the sensing unit 200, the wireless communicating unit 300 and the driver detecting unit 400, wherein the system self-testing unit 500 is configured for detecting the sensing unit 200, the wireless communicating unit 300 and the driver detecting unit 400 to generate a system testing datum. The system self-testing unit 500 of the present disclosure continuously transmits the detecting signals to the sensing unit 200, the wireless communicating unit 300 and the driver detecting unit 400 and confirms whether the detecting signals returned by each unit are normal or not.

The human-machine interaction computing unit 600 is signally connected to the sensing unit 200, the wireless communicating unit 300, the driver detecting unit 400 and the system self-testing unit 500, wherein the human-machine interaction computing unit 600 receives and computes the environmental condition datum, the field status datum, the driver controlling datum and the system testing datum to generate a driving takeover time margin $T_{T.B1}$ and a driving takeover time $T_{T.B2}$. The human-machine interaction computing unit 600 compares the driving takeover time margin $T_{T.B1}$ and the driving takeover time $T_{T.B2}$ to generate an interface warning datum. In detail, the human-machine interaction computing unit 600 can be a microcontroller unit (MCU), an electronic control unit (ECU), a computer or other computing unit. Moreover, the driving takeover time margin $T_{T.B1}$ includes a driving takeover distance D and a speed V, and the driving takeover time margin is satisfied the following equation (1):

$$T_{T.B1} = D/V \qquad \text{equation (1);}$$

where the driving takeover time margin $T_{T.B1}$ represents the remaining time margin that the driver can take over the vehicle 110. The driving takeover time margin $T_{T.B1}$ should be as large as possible, and the larger value of the driving takeover time margin $T_{T.B1}$ represents the more time that the driver can take over the vehicle 110. In addition, the driving takeover time $T_{T.B2}$ includes a surrounding traffic condition time $T_{T.D}$, a surrounding traffic condition weight $W_{T.D}$, a learning effect time $T_{L.E}$, a learning effect weight $W_{L.E}$, a driving status time $T_{EOR}$, a driving status weight $W_{EOR}$, a drive controlling transfer time $T_{C.T}$ and a drive controlling transfer weight $W_{C.T}$. The driving takeover time is satisfied the following equation (2):

$$T_{T.B2} = W_{T.D} \times T_{T.D} + W_{L.E} \times T_{L.E} + W_{EOR} \times T_{EOR} + W_{C.T} \times T_{C.T} \qquad \text{equation (2);}$$

where the driving takeover time $T_{T.B2}$ represents the time required that the driver can safely take over the vehicle 110. The the driving takeover time $T_{T.B2}$ should be as little as possible, and the less value of the driving takeover time $T_{T.B2}$ represents that the driver can take over the vehicle 110 in a shorter period of time. In a normal situation, the driving takeover time $T_{T.B2}$ is about 5 to 8 seconds. If a surrounding traffic condition of the vehicle 110 is better, the less surrounding traffic condition time $T_{T.D}$ is. If the driver is more familiar with the system, the less learning effect time is. If the driver's status is better (such as focusing on driving and having good spirit), the less the driving status time $T_{EOR}$ is. The drive controlling transfer time $T_{C.T}$ is usually a constant value based on a system controlling complexity, wherein if the system controlling complexity is lower, the less drive controlling transfer time $T_{C.T}$ is. In addition, when the driving takeover time margin $T_{T.B1}$ is greater than the driving takeover time $T_{T.B2}$, it represents that the driver has a sufficient time to take over the vehicle 110. When the driving takeover time margin $T_{T.B1}$ is equal to the driving takeover time $T_{T.B2}$, it represents that the driver has just enough time to take over the vehicle 110. When the driving takeover time margin $T_{T.B1}$ is less than the driving takeover time $T_{T.B2}$, it represents that the driver does have enough time to take over the vehicle 110. The safe warning system for automatic driving takeover 100 of the present disclosure will show warning signals and control items to the driver as a reference regardless of any of the above situations.

Furthermore, the human-machine interaction computing unit 600 analyzes the environmental condition datum, the field status datum, the driver controlling datum and the system testing datum to generate an emergency level, wherein the emergency level includes a non-emergency level, a low emergency level, a medium emergency level and a high emergency level. That is, the human-machine interaction computing unit 600 lists the emergency level for takeover according to the situations, wherein the higher emergency level represents that the situation is more critical and it needs to be urgently addressed. Six examples are shown in the following Table 1. The human-machine interaction computing unit 600 of the present disclosure can integrate various data on the vehicle 110, convert the data into the warning signals and the control items via algorithms, and show the warning signals and the control items to the driver so as to ensure that the driver can understand the subsequent corresponding control steps and the takeovers.

TABLE 1

| Situation | Emergency Level |
| --- | --- |
| Leaving the driving field | low emergency level |
| The state of the environment is changed and consequently the automatic driving must end | medium emergency level |
| Single sensor signal is temporarily interrupted | low emergency level |
| Single sensor is failed | medium emergency level |
| A plurality of sensors is failed | high emergency level |
| Conditions or events that the vehicle can not be classified | high emergency level |

The interface warning unit 700 is signally connected to the human-machine interaction computing unit 600, wherein the interface warning unit 700 receives the interface warning datum and shows the warning signal to the driver according to the interface warning datum. In detail, the interface warning unit 700 stores a first predetermined image frequency, a second predetermined image frequency, a first predetermined sound frequency, a second predetermined sound frequency, a first predetermined volume and a second predetermined volume. The warning signal of the interface warning unit 700 includes an image warning signal and a sound warning signal. The image warning signal has an image warning frequency, wherein the image warning frequency represents a blinking frequency of the image. The sound warning signal has a sound warning frequency and a warning volume. When the emergency level is the low emergency level, the image warning frequency is less than or equal to the first predetermined image frequency. The sound warning frequency is less than or equal to the first predetermined sound frequency, and the warning volume is less than or equal to the first predetermined volume. When the emergency level is the medium emergency level, the image warning frequency is greater than the first predetermined image frequency and less than or equal to the second predetermined image frequency. The sound warning frequency is greater than the first predetermined sound frequency and less than or equal to the second predetermined sound frequency, and the warning volume is greater than the first predetermined volume and less than or equal to the second predetermined volume. When the emergency level is the high emergency level, the image warning frequency is greater than the second predetermined image frequency. The sound warning frequency is greater than the second predetermined sound frequency, and the warning volume is greater than the second predetermined volume. Further, the interface warning unit 700 receives and displays the driving takeover time margin $T_{T.B1}$ and the driving takeover time $T_{T.B2}$ from the human-machine interaction computing unit 600 to the driver. In this embodiment, the interface warning unit 700 can be an instrument panel, an image display module or a sound module, wherein the instrument panel and the image display module are for displaying the image warning signal, and the sound module is for generating the sound warning signal. Therefore, the interface warning unit 700 of the present disclosure can instantly notify the driver of a current condition of the vehicle 110 by using a variety of image warning signals and sound warning signals, so that the driver can do corresponding takeover disposal.

The controlling unit 800 is signally connected to the human-machine interaction computing unit 600, wherein the controlling unit 800 regulates the vehicle 110 according to a comparing result of the driving takeover time margin $T_{T.B1}$ and the driving takeover time $T_{T.B2}$. When the comparing result of the driving takeover time margin and the driving takeover time compared by the human-machine interaction computing unit 600 is that the driving takeover time margin $T_{T.B1}$ is less than the driving takeover time $T_{T.B2}$, the human-machine interaction computing unit 600 transmits a speed adjusting signal to the controlling unit 800. Then the controlling unit 800 regulates a braking of the vehicle 110 according to the speed adjusting signal, so as to reduce the speed V of the vehicle. In addition, the controlling unit 800 can control the vehicle 110 to switch lanes. In other words, the controlling unit 800 can control a steering angle of a steering wheel. Therefore, the controlling unit 800 of the present disclosure can timely change a direction and the speed V of the vehicle 110 according to the comparing result of the human-machine interaction computing unit 600 to avoid the vehicle 110 from being in a dangerous situation.

Figure 3:
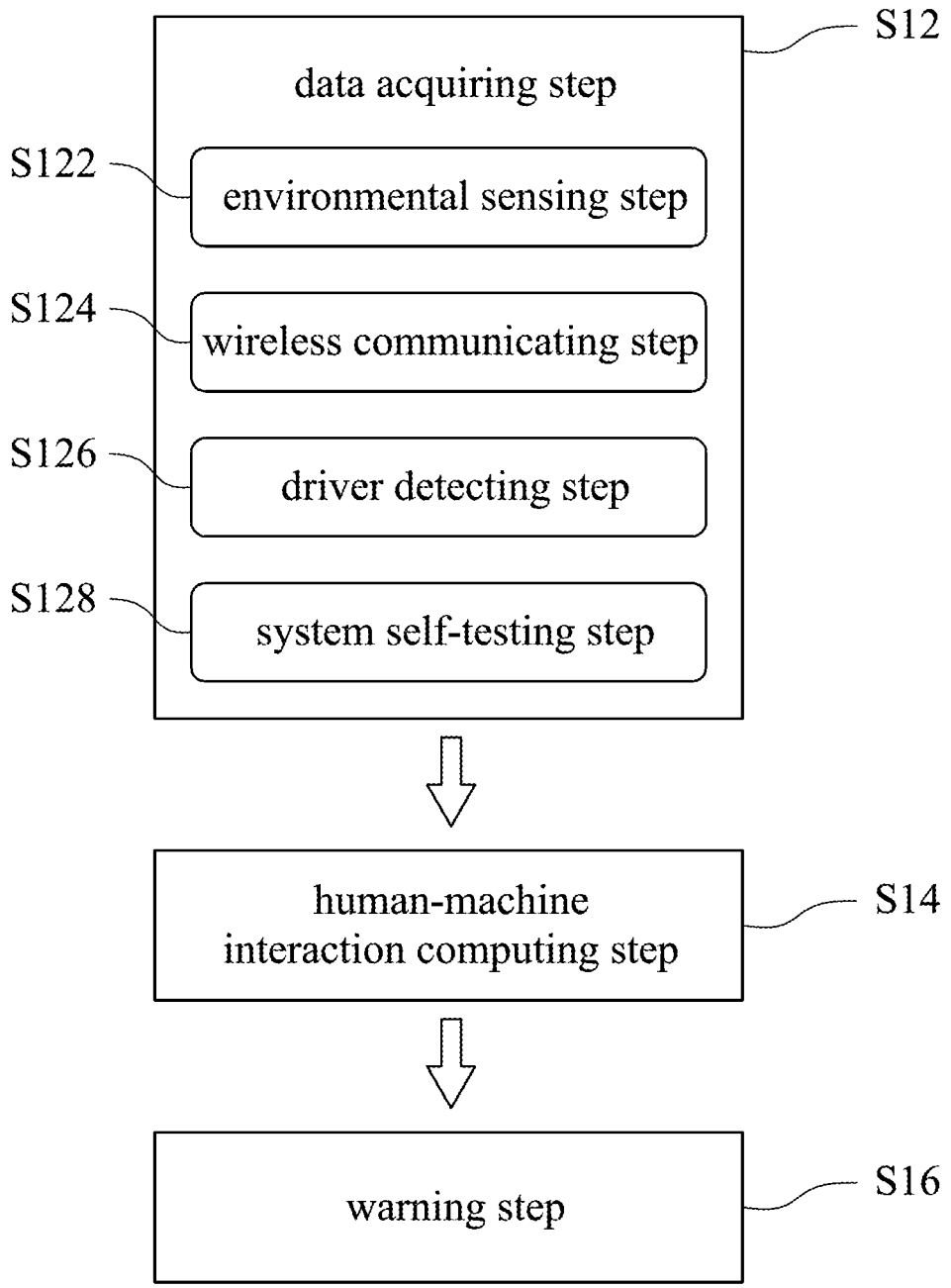
FIG. 3 is a flow chart showing a safe warning method for automatic driving takeover according to another embodiment of the present disclosure.

FIG. 3 is a flow chart showing a safe warning method for automatic driving takeover 900 according to another embodiment of the present disclosure. In FIGS. 1 and 3, the safe warning method for automatic driving takeover 900 is for warning the driver in the vehicle 110, and the safe warning method for automatic driving takeover 900 includes a data acquiring step S12, a human-machine interaction computing step S14 and a warning step S16.

The data acquiring step S12 includes an environmental sensing step S122, a wireless communicating step S124, a driver detecting step S126 and a system self-testing step S128, wherein the environmental sensing step S122, the wireless communicating step S124, the driver detecting step S126 and the system self-testing step S128 can be performed simultaneously. The environmental sensing step S122 is for driving the sensing unit 200 to sense the environmental condition of the vehicle 110 so as to generate the environmental condition datum. The wireless communicating step S124 is for driving the wireless communicating unit 300 to receive the cloud datum so as to generate the field status datum according to the cloud datum. The driver detecting step S126 is for driving the driver detecting unit 400 to detect the driver so as to generate the driver controlling datum. The system self-testing step S128 is for driving the system self-testing unit 500 to detect the sensing unit 200, the wireless communicating unit 300 and the driver detecting unit 400 so as to generate the system testing datum.

The human-machine interaction computing step S14 is for driving the human-machine interaction computing unit 600 to receive and compute the environmental condition datum, the field status datum, the driver controlling datum and the system testing datum so as to generate the driving takeover time margin $T_{T,B1}$ and the driving takeover time $T_{T,B2}$. In addition, the human-machine interaction computing step S14 is also for driving the human-machine interaction computing unit 600 to compare the driving takeover time margin $T_{T,B1}$ and the driving takeover time $T_{T,B2}$ so as to generate the interface warning datum. In detail, the driving takeover time margin $T_{T,B1}$ includes the driving takeover distance D and the speed V, and the driving takeover time margin $T_{T,B1}$ is satisfied the equation (1). The driving takeover time $T_{T,B2}$ includes the surrounding traffic condition time $T_{T,D}$, the surrounding traffic condition weight $W_{T,D}$, the learning effect time $T_{L,E}$, the learning effect weight $W_{L,E}$, the driving status time $T_{EOR}$, the driving status weight $W_{EOR}$, the drive controlling transfer time $T_{C,T}$ and the drive controlling transfer weight $W_{C,T}$. The surrounding traffic condition weight $W_{T,D}$, the learning effect weight $W_{L,E}$, the driving status weight $W_{EO}$ and the drive controlling transfer weight $W_{C,T}$ are values between 0 and 1, respectively. The driving takeover time $T_{T,B2}$ is satisfied the equation (2). In addition, the human-machine interaction computing unit 600 analyzes the environmental condition datum, the field status datum, the driver controlling datum and the system testing datum to generate the emergency level, wherein the emergency level includes the non-emergency level, the low emergency level, the medium emergency level and the high emergency level. In other words, the human-machine interaction computing unit 600 lists the emergency levels for takeover according to the situations, wherein the lower emergency level represents that the situation is more moderate and it has more time to deal with.

The warning step S16 is for driving the interface warning unit 700 to receive the interface warning datum so as to show the warning signal to the driver according to the interface warning datum. In detail, in the warning step S16, the interface warning unit 700 stores the first predetermined image frequency, the second predetermined image frequency, the first predetermined sound frequency, the second predetermined sound frequency, the first predetermined volume and the second predetermined volume. The warning signal of the interface warning unit 700 includes the image warning signal and the sound warning signal, wherein the image warning signal has the image warning frequency, and the sound warning signal has the sound warning frequency and the warning volume. When the emergency level is the low emergency level, the image warning frequency is less than or equal to the first predetermined image frequency. The sound warning frequency is less than or equal to the first predetermined sound frequency, and the warning volume is less than or equal to the first predetermined volume. When the emergency level is the medium emergency level, the image warning frequency is greater than the first predetermined image frequency and less than or equal to the second predetermined image frequency. The sound warning frequency is greater than the first predetermined sound frequency and less than or equal to the second predetermined sound frequency, and the warning volume is greater than the first predetermined volume and less than or equal to the second predetermined volume. When the emergency level is the high emergency level, the image warning frequency is greater than the second predetermined image frequency. The sound warning frequency is greater than the second predetermined sound frequency, and the warning volume is greater than the second predetermined volume. In addition, the interface warning unit 700 receives and displays the driving takeover time margin $T_{T,B1}$ and the driving takeover time $T_{T,B2}$ from the human-machine interaction computing unit 600 to the driver. Therefore, the warning step S16 of the present disclosure combined with the interface warning unit 700 can instantly notify the driver of the current situation of the vehicle 110 by using a variety of image warning signals and sound warning signals, so that the driver can do corresponding takeover disposal to improve the safety and smoothness of driving takeover.

Figure 4:
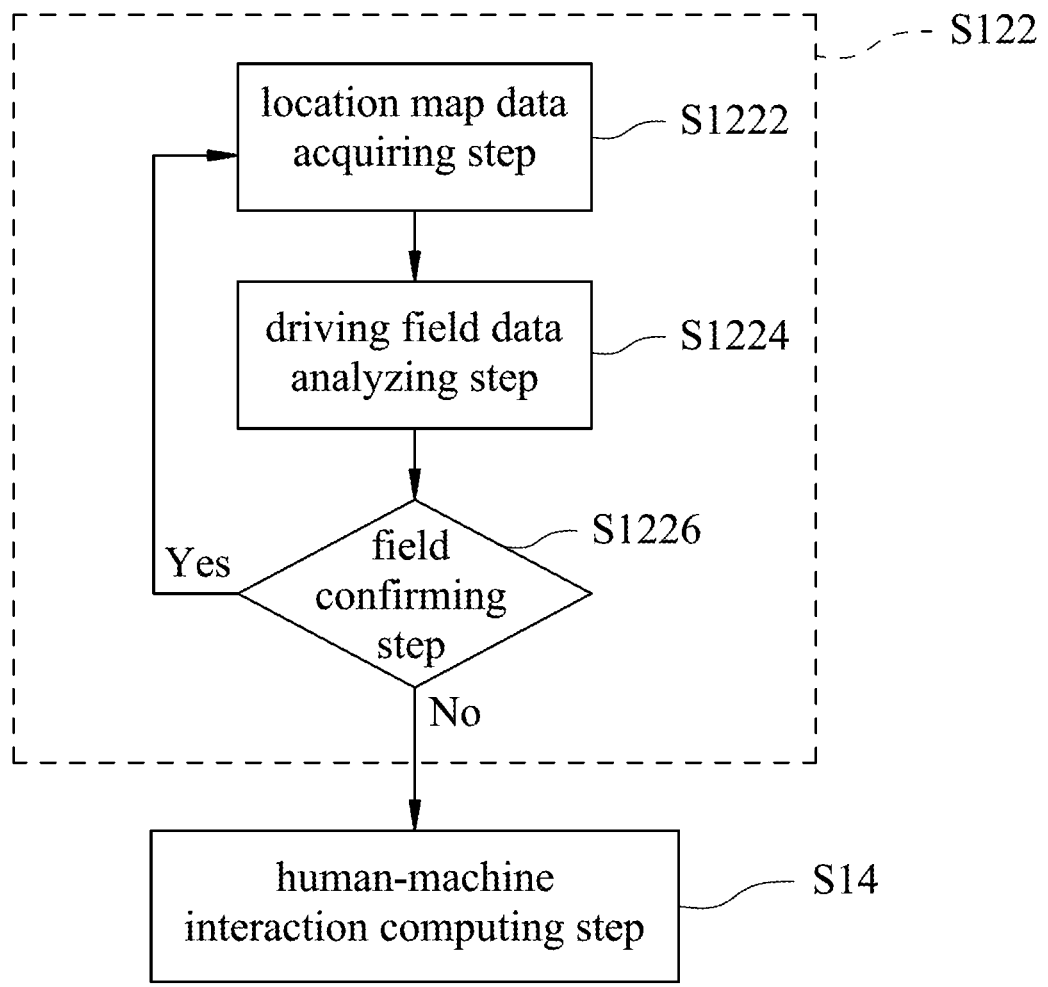
FIG. 4 is a flow chart showing an environmental sensing step according to another embodiment of the present disclosure.

FIG. 4 is a flow chart showing the environmental sensing step S122 according to another embodiment of the present disclosure. In FIGS. 1, 3 and 4, the environmental sensing step S122 includes a location map data acquiring step S1222, a driving field data analyzing step S1224 and a field confirming step S1226. First, in the location map data acquiring step S1222, location map data of the corresponding vehicle 110 are acquired by the sensing unit 200 (such as Real-Time Kinematic (RTK) module). Next, in the driving field data analyzing step S1224, possible driving field data of the vehicle 110 (for example, the driving field is a highway, an urban road, or an expressway) are analyzed according the location map data. Then, whether the driving field of the vehicle 110 is changed or not is confirmed in the field confirming step S1226. If the driving field of the vehicle 110 is changed, it represents that the vehicle 110 will not be in right driving field soon. At this time, the safe warning system needs to perform the human-machine interaction computing step S14 and the warning step S16 for performing subsequent computation, analysis and warning, and then notifies the driver how to take over the vehicle 110 in the situation that does not meet the driving field.

Figure 5:
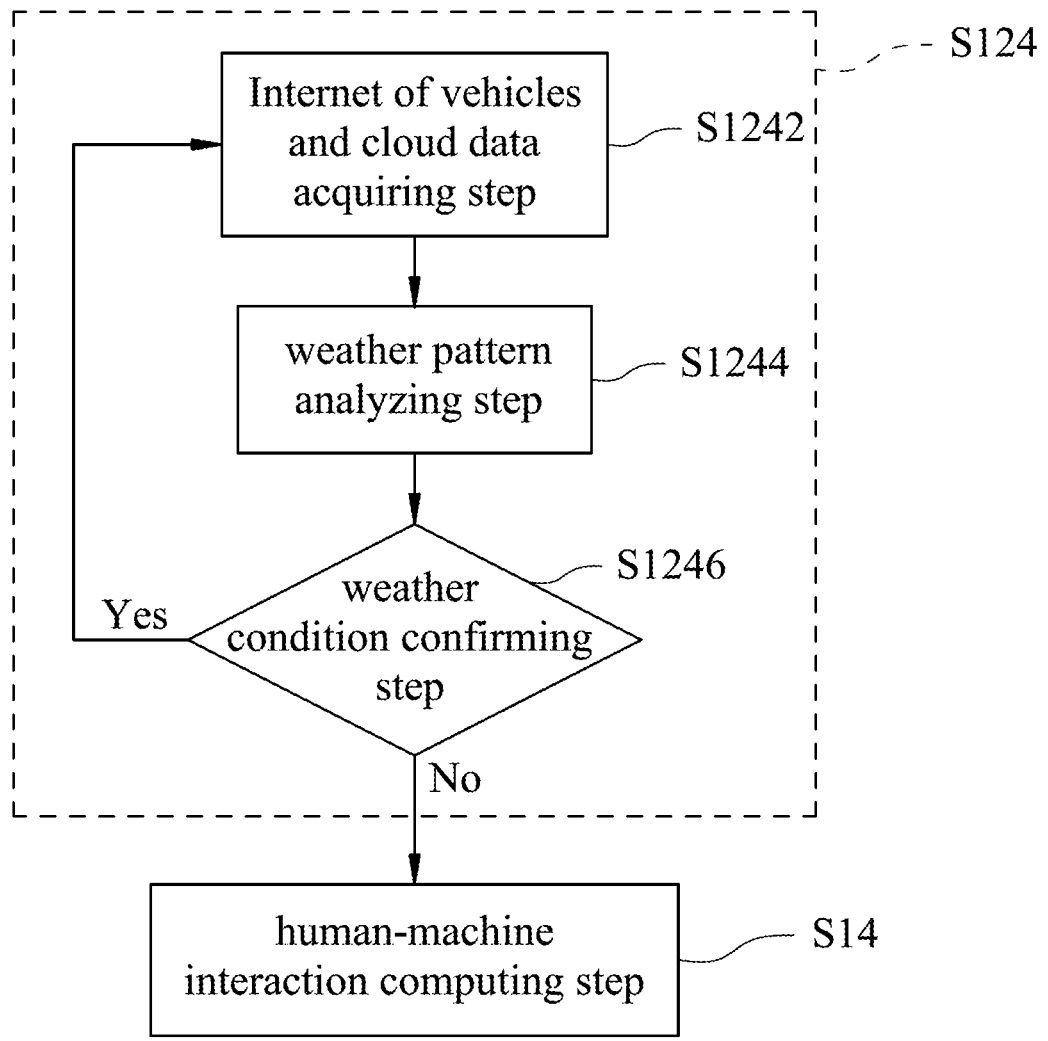
FIG. 5 is a flow chart showing a wireless communicating step according to another embodiment of the present disclosure.

FIG. 5 is a flow chart showing the wireless communicating step S124 according to another embodiment of the present disclosure. In FIGS. 1, 3 and 5, the wireless communicating step S124 includes an internet of vehicles and cloud data acquiring step S1242, a weather pattern analyzing step S1244 and a weather condition confirming step S1246. First, in the internet of vehicles and cloud data acquiring step S1242, positioning coordinates of the corresponding vehicle 110 are acquired by the wireless communicating unit 300 (such as the fourth generation of wireless/mobile communication device). Next, in the weather pattern analyzing step S1244, a weather pattern within a distance range (such as 3 to 5 km) in front of the vehicle 110 is analyzed according to the positioning coordinates of the vehicle 110. Then, whether the weather pattern within the distance range in the front of the vehicle 110 is changed is confirmed in the weather condition confirming step S1246. If the weather pattern in front of the vehicle 110 is changed, it represents that the vehicle 110 will enter an area that does not meet the weather pattern. At this time, the safe warning system needs to perform the human-machine interaction computing step S14 and the warning step S16 for performing subsequent computation, analysis and warning, and then notifies the driver how to take over the vehicle 110 in the situation that does not meet the weather pattern.

Figure 6:
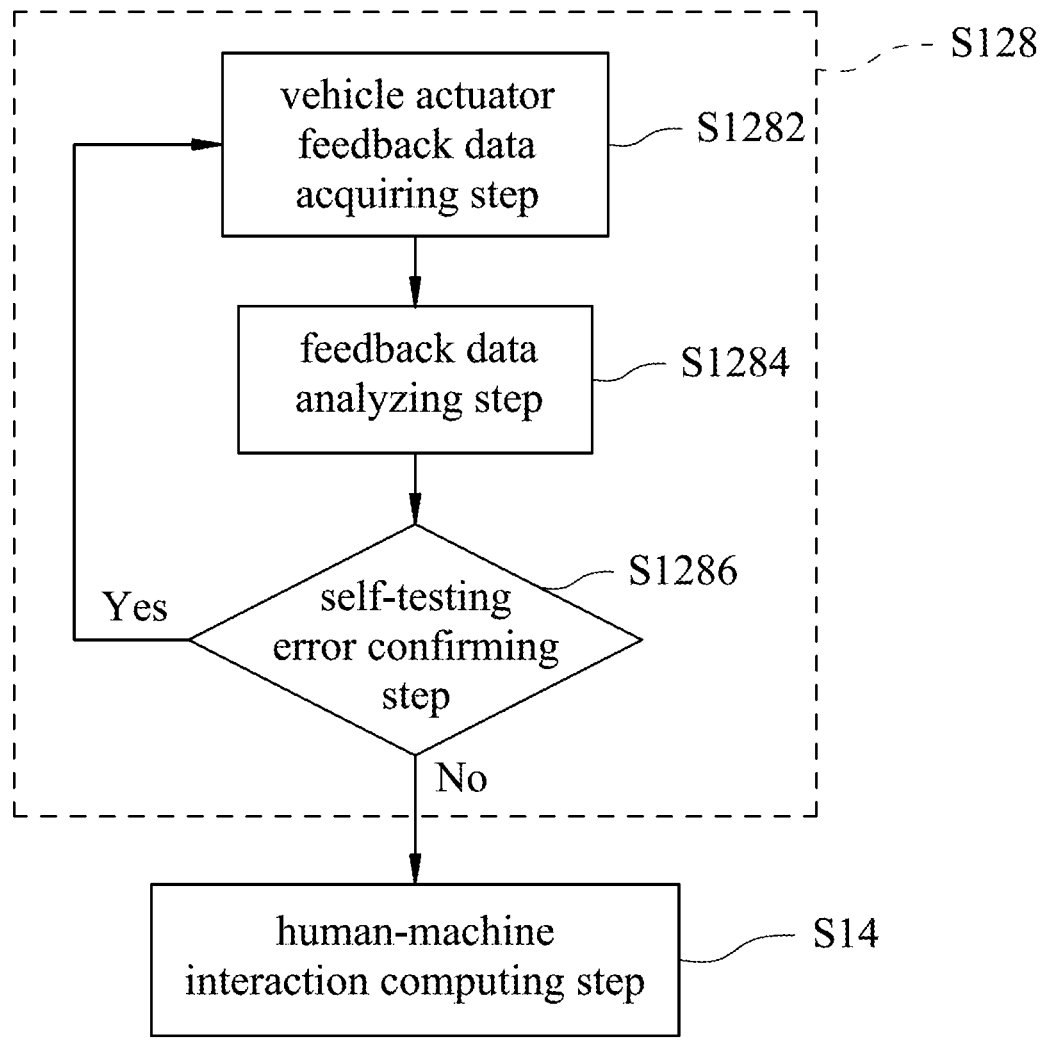
FIG. 6 is a flow chart showing a system self-testing step according to another embodiment of the present disclosure.

FIG. 6 is a flow chart showing the system self-testing step S128 according to another embodiment of the present disclosure. In FIGS. 1, 3 and 6, the system self-testing step S128 includes a vehicle actuator feedback data acquiring step S1282, a feedback data analyzing step S1284 and a self-testing error confirming step S1286. First, in the vehicle actuator feedback data acquiring step S1282, detecting data of a vehicle actuator disposed on the vehicle 110 are required by the system self-testing unit 500, wherein the detecting data are vehicle actuator feedback data. Next, whether an angle difference of the vehicle 110 is too large or not is analyzed according to the vehicle actuator feedback data. Then, the self-testing error confirming step S1286 is for confirming whether or not the actuator is abnormal. If the actuator is abnormal, it represents that the automatic driving system condition of the vehicle 110 may be abnormal. At this time, the safe warning system needs to perform the human-machine interaction computing step S14 and the warning step S16 for performing subsequent computation, analysis and warning, and then notifies the driver how to take over the vehicle 110 when detecting abnormal conditions.

Figure 7:
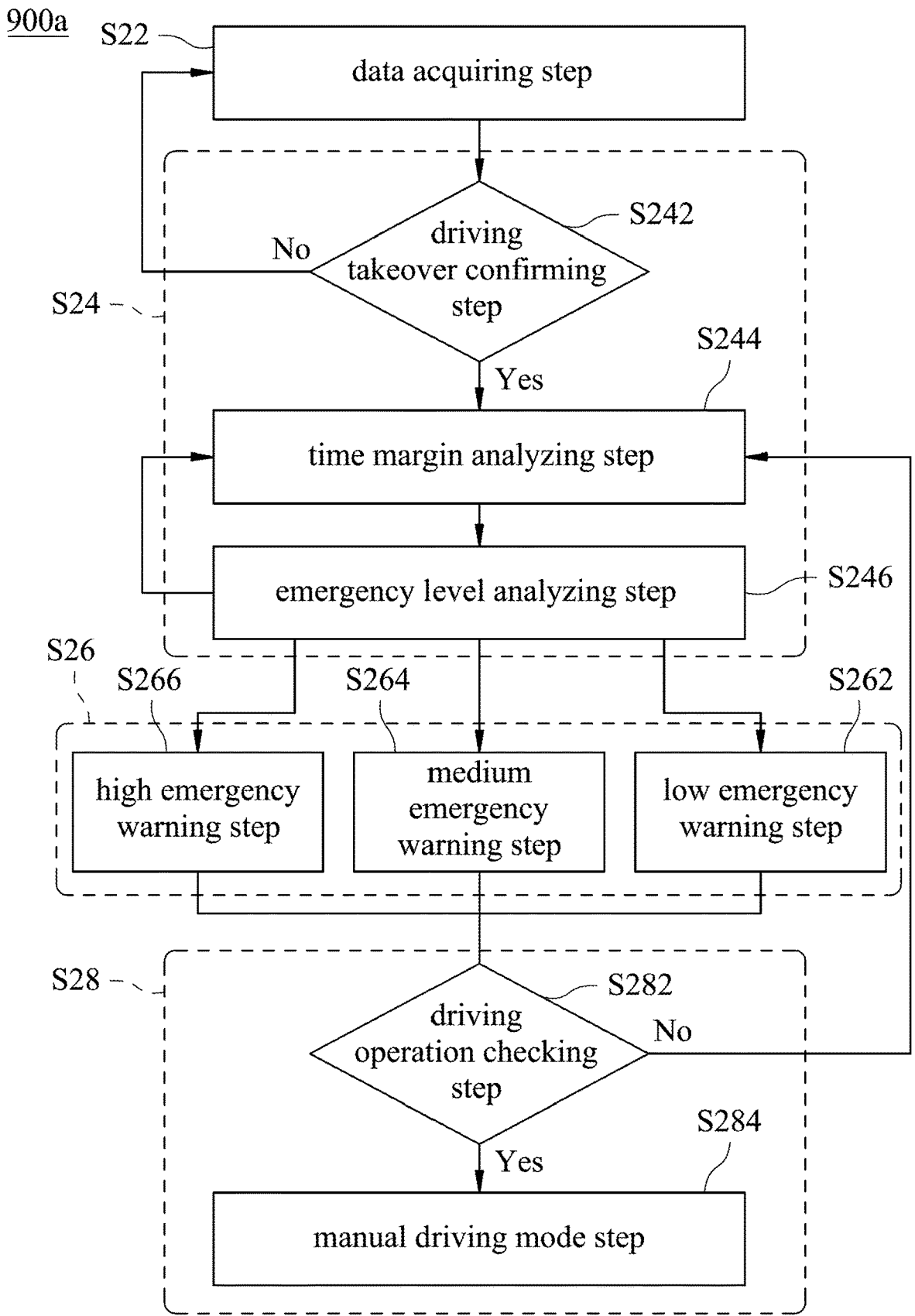
FIG. 7 is a flow chart showing a safe warning method for automatic driving takeover according to still another embodiment of the present disclosure.

FIG. 7 is a flow chart showing a safe warning method for automatic driving takeover 900a according to still another embodiment of the present disclosure. In FIGS. 1, 3 and 7, the safe warning method for automatic driving takeover 900a includes a data acquiring step S22, a human-machine interaction computing step S24, a warning step S26 and a driving takeover step S28.

The data acquiring step S22 is same as the data acquiring step S12 in FIG. 3, and the details are not be described here. The human-machine interaction computing step S24 includes a driving takeover confirming step S242, a time margin analyzing step S244 and an emergency level analyzing step S246. The driving takeover confirming step S242 is for confirming whether or not the safe warning system requires the takeover of the driver. If a confirmation answer is "No", the safe warning system continues to perform automatic driving without requesting the driver to take over. If the confirmation answer is "Yes", the safe warning system is unable to drive automatically and then requests the driver to take over. Next, the time margin analyzing step S244 is for analyzing and outputting the driving takeover time margin $T_{T,B1}$ and the driving takeover time $T_{T,B2}$. Then, the emergency level analyzing step S246 is for analyzing the current emergency level of situation of the vehicle 110, wherein the emergency level includes the non-emergency level, the low emergency level, the medium emergency level and the high emergency level. If the emergency level is the non-emergency level, the safe warning system re-performs the time margin analyzing step S244. If the emergency level is the low emergency level, the medium emergency level and the high emergency level, the safe warning system performs a warning step S26. In addition, the warning step S26 includes a low emergency warning step S262, a medium emergency warning step S264 and a high emergency warning step S266, wherein warning modes in the low emergency warning step S262, the medium emergency warning step S264 and the high emergency warning step S266 are same as that at the interface warning unit 700 in the warning step S16 of FIG. 3. In other words, in the low emergency warning step S262, the image warning frequency and the sound warning frequency of the warning signals are mild and weak, and the safe warning system controls the vehicle 110 to switch to a slow lane. In the medium emergency warning step S264, the image warning frequency and the sound warning frequency of the warning signals are gradually increased and accelerated, and the safe warning system reduces the speed V of the vehicle 110 to a road speed limit.

In the high emergency warning step S266, the image warning frequency and the sound warning frequency of the warning signals are rapid and intense, and the safe warning system controls the vehicle 110 to enter the safe mode, for example, controlling the vehicle 110 to park in a safe environment (roadside). In addition, the driving takeover step S28 includes a driving operation checking step S282 and a manual driving mode step S284. In the driving operation checking step S282, the safe warning system confirms whether the driver operates, that is, the system confirms whether or not the driver can take over. If the confirmation answer is "No", it represents that the driver has no operation, and the safe warning system can only continue the automatic driving and re-perform the time margin analyzing step S244. If the confirmation answer is "Yes", the driver is ready to take over the vehicle 110, and the safe warning system performs the manual driving mode step S284. In the manual driving mode step S284, the safe warning system interrupts the control of the vehicle 110, so that the main control is returned back to the driver. Therefore, the safe warning method for automatic driving takeover 900a of the present disclosure can integrate various data on the vehicle 110, convert the data into the warning signals and the control items via the algorithms, and show the warning signals and the control items to the driver so as to ensure that the driver can understand the subsequent corresponding control steps and takeovers for reducing possible control errors when the driver takes over.

Figure 8:
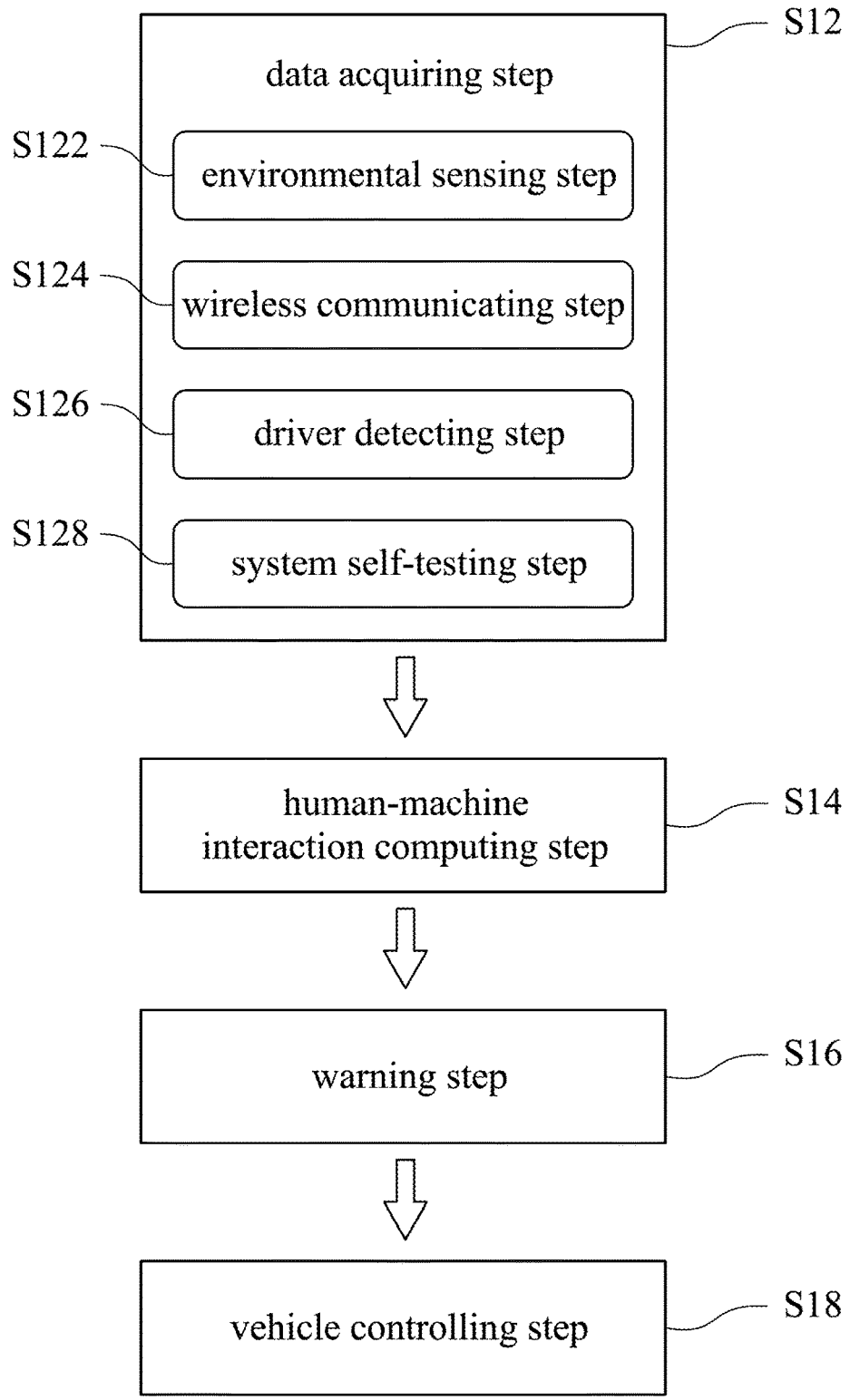
FIG. 8 is a flow chart showing a safe warning method for automatic driving takeover according to yet another embodiment of the present disclosure.

FIG. 8 is a flow chart showing a safe warning method for automatic driving takeover 900b according to yet another embodiment of the present disclosure. In FIGS. 1, 3 and 8, the safe warning method for automatic driving takeover 900b includes the data acquiring step S12, the human-machine interaction computing step S14, the warning step S16 and a vehicle controlling step S18. The data acquiring step S12, the human-machine interaction computing step S14 and the warning step S16 are same as that shown in FIG. 3, and the details are not described here. The safe warning method for automatic driving takeover 900b further includes the vehicle controlling step S18, wherein the vehicle controlling step S18 is for driving the controlling unit 800 to regulate the vehicle 110 according to the comparing result of the driving takeover time margin $T_{T,B1}$ and the driving takeover time $T_{T,B2}$. In addition, when the emergency level analyzed by the human-machine interaction computing unit 600 is the low emergency level, the medium emergency level or the high emergency level and the driving takeover time margin $T_{T,B1}$ is less than or equal to the driving takeover time $T_{T,B2}$, the human-machine interaction computing unit 600 transmits the speed adjusting signal to the controlling unit 800, and the controlling unit 800 regulates the braking of the vehicle 110 according to the speed adjusting signal so as to reduce the speed V of the vehicle 110.

Further, each of three different emergency levels will be illustrated by one example. In the first example, the situation is "leaving the driving field", that is, the vehicle 110 is ready for an interchange from the highway. As shown in Table 1, the emergency level in this situation is the low emergency level. In this situation, assuming that the speed V for automatic driving is 120 km/hr and the driving takeover distance D is 2 km. The driving takeover time margin $T_{T,B1}$ is 60 seconds which is calculated according to the equation (1). If the driver is awake, and the driving takeover time $T_{T,B2}$ is 15 seconds which is calculated according to the equation (2). Because the driving takeover time margin $T_{T,B1}$ is greater than the driving takeover time $T_{T,B2}$, the safe warning system can allow the vehicle 110 driving at the original speed V, and it is expected to notify the driver to take over the vehicle 110 15 seconds before reaching the next interchange. Moreover, if the driver is distracted, and the driving takeover time $T_{T.B2}$ is 30 seconds which is calculated according to the equation (2). Because the driving takeover time margin $T_{T.B1}$ is still greater than the driving takeover time $T_{T.B2}$, the safe warning system can allow the vehicle 110 driving at the original speed V, and it is expected to notify the driver to take over the vehicle 110 30 seconds before reaching the next interchange. In addition, if the driver is drowsy, and the driving takeover time $T_{T.B2}$ is 90 seconds which is calculated according to the equation (2). Because the driving takeover time margin $T_{T.B1}$ is less than the driving takeover time $T_{T.B2}$, the safe warning system must notify the driver with the low emergency level to shorten the driving takeover time $T_{T.B2}$. Therefore, the safe warning system can increase the driving takeover time margin $T_{T.B1}$ by decreasing the speed V until the driving takeover time margin $T_{T.B1}$ is greater than the driving takeover time $T_{T.B2}$.

In the second example, the situation is that "single sensor is failed", that is, the system self-testing unit 500 detects that one of the sensor disposed on the vehicle 110 is failed. As shown in Table 1, the emergency level in this situation is the medium emergency level. In this situation, assuming that the speed V for automatic driving is 50 km/hr and the driving takeover distance D is 100 m. The driving takeover time margin $T_{T.B1}$ is 7.2 seconds which is calculated according to the equation (1). If the driver is awake, and the driving takeover time $T_{T.B2}$ is 7.2 seconds which is calculated according to the equation (2). Because the driving takeover time margin $T_{T.B1}$ is equal to the driving takeover time $T_{T.B2}$, the safe warning system slightly decreases the speed V of the vehicle 110 and immediately notifies the driver to take over the vehicle 110. Moreover, if the driver is distracted, and the driving takeover time $T_{T.B2}$ is 10 seconds which is calculated according to the equation (2). Because the driving takeover time margin $T_{T.B1}$ is less than the driving takeover time $T_{T.B2}$, the safe warning system must notify the driver with the medium emergency level to shorten the driving takeover time $T_{T.B2}$, and decrease the speed V to increase the driving takeover time margin $T_{T.B1}$ simultaneously. In the normal situation, the shortest driving takeover time $T_{T.B2}$ is about 5 seconds. Even if the driving takeover time $T_{T.B2}$ is shortened by notifying the driver with the middle emergency level, the remaining driving takeover time margin $T_{T.B1}$ (for example, 3 seconds remaining) is not enough for the driver to safely take over the vehicle 110. Therefore, in this example, the safe warning system controls the vehicle 110 to enter the safe mode, for example, the vehicle 110 is controlled to park in the safe environment (roadside) and activate hazard warning lights.

In the third example, the situation is that "a plurality of sensors is failed", that is, the system self-testing unit 500 detects that a plurality of the sensor disposed on the vehicle 110 are failed. As shown in Table 1, the emergency level in this situation is the high emergency level. In this situation, assuming that the speed V for automatic driving is 50 km/hr and the driving takeover distance D is 40 m. The driving takeover time margin $T_{T.B1}$ is 3 seconds which is calculated according to the equation (1), and the shortest driving takeover time $T_{T.B2}$ is about 5 seconds in the normal situation. Because the driving takeover time margin $T_{T.B1}$ is less than the driving takeover time $T_{T.B2}$, the remaining driving takeover time margin $T_{T.B1}$ (for example, 2 seconds remaining) is not enough for the driver to safely take over the vehicle 110 even if the driving takeover time $T_{T.B2}$ is shortened by notifying the driver with the high emergency level. Therefore, in this example, the safe warning system controls the vehicle 110 to enter the safe mode, for example, the vehicle 110 is controlled to park in the safe environment (roadside) and activate the hazard warning lights.

According to the foregoing embodiments of the disclosure, the safe warning system for automatic driving takeover and the safe warning method thereof of the present disclosure have advantages as follows. First, the safe warning system of the present disclosure can integrate various data on the vehicle, convert the data into the warning signals and the control items via the algorithms, and show the warning signals and the control items to the driver so as to ensure that the driver can understand the subsequent corresponding control steps and takeovers for reducing possible control errors when the driver takes over. Second, the safe warning system of the present disclosure uses the driving takeover time margin, the driving takeover time and the emergency level to classify expected controls in current time and at a later time, and uses vehicle controls and warning signals to increase the driving takeover time margin or shorten the driving takeover time for improving an awareness of the driver in the current condition. Therefore, the safe warning system of the present disclosure can reduce possible control errors when the driver takes over. Third, the presentation of multiple warning signals and control items not only allows the driver to understand the subsequent corresponding control steps, but also solves the problems that the driver used the conventional automatic driving system needs to touch the steering wheel with their hands at predefined intervals.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A safe warning system for automatic driving takeover, which is disposed on a vehicle to warn a driver, the safe warning system for automatic driving takeover comprising:
  a sensing unit disposed on the vehicle, wherein the sensing unit is configured for sensing an environmental condition of the vehicle to generate an environmental condition datum;
  a wireless communicating unit disposed on the vehicle, wherein the wireless communicating unit is configured for receiving a cloud datum to generate a field status datum according to the cloud datum;
  a driver detecting unit disposed on the vehicle and corresponding to the driver, wherein the driver detecting unit is configured for detecting the driver to generate a driver controlling datum;
  a system self-testing unit disposed on the vehicle and signally connected to the sensing unit, the wireless communicating unit and the driver detecting unit, wherein the system self-testing unit is configured for detecting the sensing unit, the wireless communicating unit and the driver detecting unit to generate a system testing datum;

a human-machine interaction computing unit signally connected to the sensing unit, the wireless communicating unit, the driver detecting unit and the system self-testing unit, wherein the human-machine interaction computing unit receives and computes the environmental condition datum, the field status datum, the driver controlling datum and the system testing datum to generate a driving takeover time margin and a driving takeover time, and the human-machine interaction computing unit compares the driving takeover time margin and the driving takeover time to generate an interface warning datum; and an interface warning unit signally connected to the human-machine interaction computing unit, wherein the interface warning unit receives the interface warning datum and shows a warning signal to the driver according to the interface warning datum.

2. The safe warning system for automatic driving takeover of claim 1, wherein the human-machine interaction computing unit analyzes the environmental condition datum, the field status datum, the driver controlling datum and the system testing datum to generate an emergency level, and the emergency level comprises a non-emergency level, a low emergency level, a medium emergency level and a high emergency level.

3. The safe warning system for automatic driving takeover of claim 2, further comprising:

a controlling unit signally connected to the human-machine interaction computing unit, wherein the controlling unit regulates the vehicle according to a comparing result of the driving takeover time margin and the driving takeover time;

wherein when the emergency level is the low emergency level, the medium emergency level or the high emergency level and the driving takeover time margin is less than or equal to the driving takeover time, the human-machine interaction computing unit transmits a speed adjusting signal to the controlling unit, and the controlling unit regulates a braking of the vehicle according to the speed adjusting signal so as to reduce a speed of the vehicle.

4. The safe warning system for automatic driving takeover of claim 1, wherein the driving takeover time margin comprises a driving takeover distance and a speed, the driving takeover distance is D, the speed is V, the driving takeover time margin is $T_{T.B1}$, and the following equation is satisfied:

$$T_{T.B1}=D/V.$$

5. The safe warning system for automatic driving takeover of claim 2, wherein, the interface warning unit stores a first predetermined image frequency, a second predetermined image frequency, a first predetermined sound frequency, a second predetermined sound frequency, a first predetermined volume and a second predetermined volume, the warning signal of the interface warning unit comprises an image warning signal and a sound warning signal, the image warning signal has an image warning frequency, and the sound warning signal has a sound warning frequency and a warning volume;

when the emergency level is the low emergency level, the image warning frequency is less than or equal to the first predetermined image frequency, the sound warning frequency is less than or equal to the first predetermined sound frequency, and the warning volume is less than or equal to the first predetermined volume;

when the emergency level is the medium emergency level, the image warning frequency is greater than the first predetermined image frequency and less than or equal to the second predetermined image frequency, the sound warning frequency is greater than the first predetermined sound frequency and less than or equal to the second predetermined sound frequency, and the warning volume is greater than the first predetermined volume and less than or equal to the second predetermined volume; and when the emergency level is the high emergency level, the image warning frequency is greater than the second predetermined image frequency, the sound warning frequency is greater than the second predetermined sound frequency, and the warning volume is greater than the second predetermined volume;

wherein the first predetermined image frequency is less than the second predetermined image frequency, the first predetermined sound frequency is less than the second predetermined sound frequency, and the first predetermined volume is less than the second predetermined volume.

6. The safe warning system for automatic driving takeover of claim 1, wherein the interface warning unit receives and displays the driving takeover time margin and the driving takeover time from the human-machine interaction computing unit.

7. The safe warning system for automatic driving takeover of claim 1, wherein the driving takeover time comprises a surrounding traffic condition time, a surrounding traffic condition weight, a learning effect time, a learning effect weight, a driving status time, a driving status weight, a drive controlling transfer time and a drive controlling transfer weight, the surrounding traffic condition time is $T_{T.D}$, the surrounding traffic condition weight is $W_{T.D}$, the learning effect time is $T_{L.E}$, the learning effect weight is $W_{L.E}$, the driving status time is $T_{EOR}$, the driving status weight is $W_{EOR}$, the drive controlling transfer time is $T_{C.T}$, the drive controlling transfer weight is $W_{C.T}$, the driving takeover time is $T_{T.B2}$, and the following equation is satisfied:

$$T_{T.B2}=W_{T.D}\times T_{T.D}+W_{L.E}\times T_{L.E}+W_{EOR}\times T_{EOR}+W_{C.T}\times T_{C.T}$$

8. A safe warning method for automatic driving takeover, which is for warning a driver in a vehicle, the safe warning method for automatic driving takeover comprising:

providing an environmental sensing step, wherein the environmental sensing step is for driving a sensing unit to sense an environmental condition of the vehicle so as to generate an environmental condition datum;

providing a wireless communicating step, wherein the wireless communicating step is for driving a wireless communicating unit to receive a cloud datum so as to generate a field status datum according to the cloud datum;

providing a driver detecting step, wherein the driver detecting step is for driving a driver detecting unit to detect the driver so as to generate a driver controlling datum;

providing a system self-testing step, wherein the system self-testing step is for driving a system self-testing unit to detect the sensing unit, the wireless communicating unit and the driver detecting unit so as to generate a system testing datum;

providing a human-machine interaction computing step, wherein the human-machine interaction computing step is for driving a human-machine interaction computing unit to receive and compute the environmental condition datum, the field status datum, the driver controlling datum and the system testing datum so as to generate a driving takeover time margin and a driving takeover time, and driving the human-machine interaction computing unit to compare the driving takeover time margin and the driving takeover time so as to generate an interface warning datum; and providing a warning step, wherein the warning step is for driving an interface warning unit to receive the interface warning datum so as to show a warning signal to the driver according to the interface warning datum.

9. The safe warning method for automatic driving takeover of claim 8, wherein, in the human-machine interaction computing step, the human-machine interaction computing unit analyzes the environmental condition datum, the field status datum, the driver controlling datum and the system testing datum to generate an emergency level, and the emergency level comprises a non-emergency level, a low emergency level, a medium emergency level and a high emergency level.

10. The safe warning method for automatic driving takeover of claim 9, further comprising:

providing a vehicle controlling step, wherein the vehicle controlling step is for driving a controlling unit to regulate the vehicle according to a comparing result of the driving takeover time margin and the driving takeover time;

wherein when the emergency level is the low emergency level, the medium emergency level or the high emergency level and the driving takeover time margin is less than or equal to the driving takeover time, the human-machine interaction computing unit transmits a speed adjusting signal to the controlling unit, and the controlling unit regulates a braking of the vehicle according to the speed adjusting signal so as to reduce a speed of the vehicle.

11. The safe warning method for automatic driving takeover of claim 8, wherein, in the human-machine interaction computing step, the driving takeover time margin comprises a driving takeover distance and a speed, the driving takeover distance is D, the speed is V, the driving takeover time margin is $T_{T.B1}$, and the following equation is satisfied:

$$T_{T.B1} = D/V.$$

12. The safe warning method for automatic driving takeover of claim 9, wherein, in warning step, the interface warning unit stores a first predetermined image frequency, a second predetermined image frequency, a first predetermined sound frequency, a second predetermined sound frequency, a first predetermined volume and a second predetermined volume, the warning signal of the interface warning unit comprises an image warning signal and a sound warning signal, the image warning signal has an image warning frequency, and the sound warning signal has a sound warning frequency and a warning volume;

when the emergency level is the low emergency level, the image warning frequency is less than or equal to the first predetermined image frequency, the sound warning frequency is less than or equal to the first predetermined sound frequency, and the warning volume is less than or equal to the first predetermined volume;

when the emergency level is the medium emergency level, the image warning frequency is greater than the first predetermined image frequency and less than or equal to the second predetermined image frequency, the sound warning frequency is greater than the first predetermined sound frequency and less than or equal to the second predetermined sound frequency, and the warning volume is greater than the first predetermined volume and less than or equal to the second predetermined volume; and when the emergency level is the high emergency level, the image warning frequency is greater than the second predetermined image frequency, the sound warning frequency is greater than the second predetermined sound frequency, and the warning volume is greater than the second predetermined volume;

wherein the first predetermined image frequency is less than the second predetermined image frequency, the first predetermined sound frequency is less than the second predetermined sound frequency, and the first predetermined volume is less than the second predetermined volume.

13. The safe warning method for automatic driving takeover of claim 8, wherein, in the warning step, the interface warning unit receives and displays the driving takeover time margin and the driving takeover time from the human-machine interaction computing unit.

14. The safe warning method for automatic driving takeover of claim 8, wherein the driving takeover time comprises a surrounding traffic condition time, a surrounding traffic condition weight, a learning effect time, a learning effect weight, a driving status time, a driving status weight, a drive controlling transfer time and a drive controlling transfer weight, the surrounding traffic condition time is $T_{T.D}$, the surrounding traffic condition weight is $W_{T.D}$, the learning effect time is $T_{L.E}$, the learning effect weight is $W_{L.E}$, the driving status time is $T_{EOR}$, the driving status weight is $W_{EOR}$, the drive controlling transfer time is $T_{C.T}$, the drive controlling transfer weight is $W_{C.T}$, the driving takeover time is $T_{T.B2}$, and the following equation is satisfied:

$$T_{T.B2} = W_{T.D} \times T_{T.D} + W_{L.E} \times T_{L.E} + W_{EOR} \times T_{EOR} + W_{C.T} \times T_{C.T}.$$

* * * * *